Oct. 27, 1925.
L. R. RUTHENBURG
1,558,637
LOCK FOR STEERING WHEELS
Filed Feb. 23, 1923
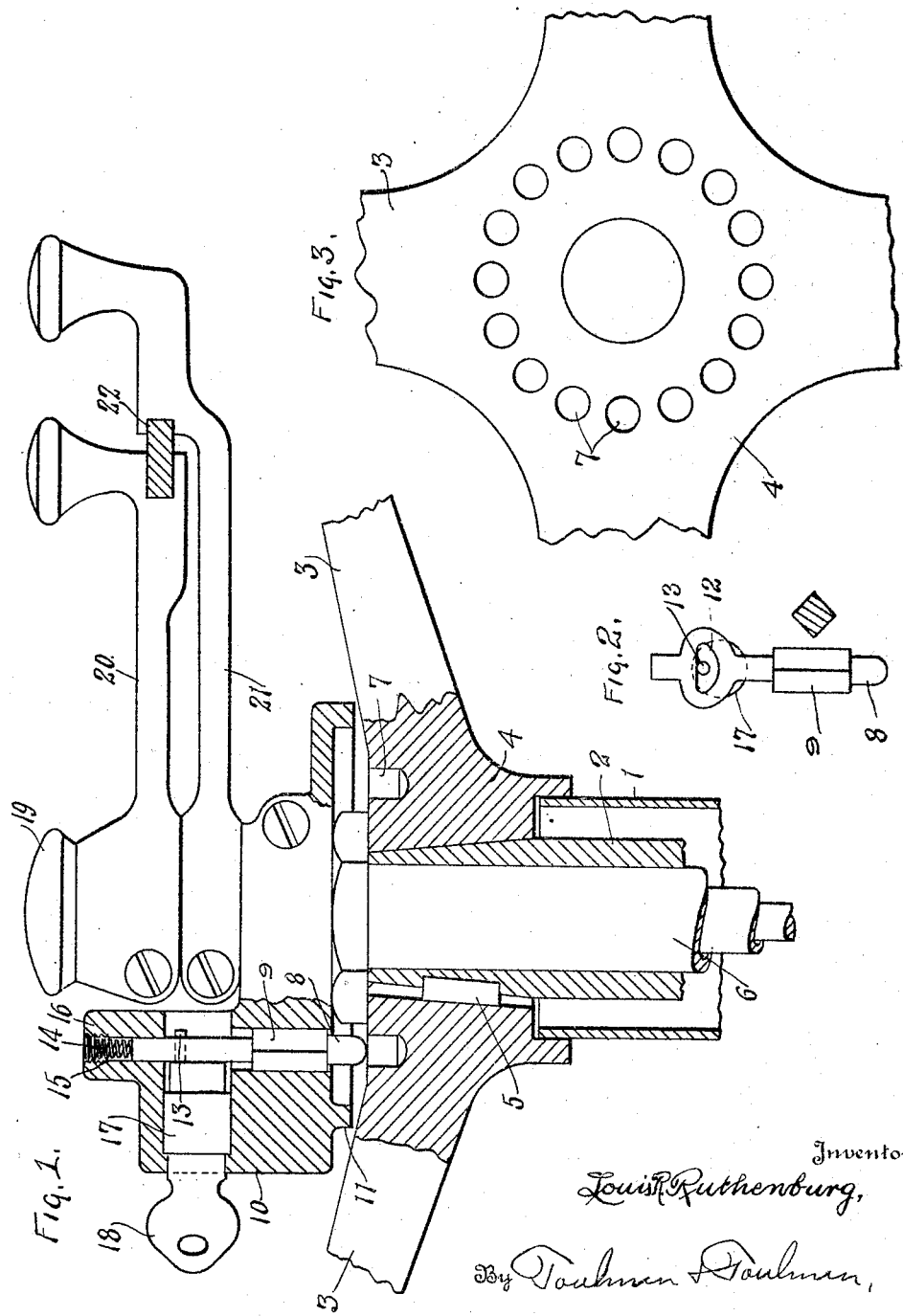

Patented Oct. 27, 1925.

1,558,637

UNITED STATES PATENT OFFICE.

LOUIS R. RUTHENBURG, OF DAYTON, OHIO.

LOCK FOR STEERING WHEELS.

Application filed February 23, 1923. Serial No. 620,794.

*To all whom it may concern:*

Be it known that I, LOUIS R. RUTHENBURG, a citizen of the United States, residing at Dayton, in the county of Montgomery and State of Ohio, have invented certain new and useful Improvements in Locks for Steering Wheels, of which the following is a specification, reference being had therein to the accompanying drawing.

My invention relates to locks and in particular to locks for steering wheels of vehicles.

It is the object of my invention to provide a lock for locking the steering wheel to the vehicle in a fixed position relative to the vehicle itself so that the wheel and its shaft cannot be rotated.

It is the further object of my invention to provide a lock above the steering wheel and to so protect it that it cannot be tampered with.

It is a further object to provide a lock which may be easily and quickly located in position; which will be sturdy and strong and easily manufactured, and shall be readily accessible to the operator of the vehicle.

Referring to the drawings, Figure 1 is a side elevation of the assembled mechanism partially in section. Figure 2 is a detail of the locking plunger, and Figure 3 is a plan view of the locking apertures in the hub of the steering wheel.

Referring to the drawings in detail, 1 is a housing of the steering column assembly in which there is located a steering column 2 having mounted thereon a steering wheel 3 which is provided with a hub 4. This hub is attached by a key 5 or any other suitable means to the steering column 2. 6 designates a supporting stationary tube for supporting the assembly of gas and spark controls, the quadrant, and lock above the steering wheel.

The upper face of the hub is provided with a series of apertures 7 for the securing of the locking end 8 of the locking finger or pin 9. This locking pin reciprocates in a casing 10 mounted on top of the stationary tubular member 6. This casing is provided with a skirt 11, the lower edge of which is closely adjacent to the upper surface of the steering wheel and its hub preventing the insertion of any instrument for the purpose of tampering with the lock.

This plunger 9 is provided with an eye 12 in which a locking finger 13 travels for the purpose of elevating it out of locking position with the steering wheel against the resistance of a spring 14. This spring 14 is carried in a chamber 15 in the upper part of a housing designated 16.

The locking finger 13 is attached to the barrel of the lock 17 which in turn is actuated by a key 18.

19 refers to a horn button, 20 to one of the controls and 21 to the other of the controls engaged with a quadrant 22.

It will be observed that a key and a lock located above the steering wheel enables the operator to quickly and effectively lock the steering wheel to prevent the operation of the car by unauthorized persons.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent is:—

1. In combination, a steering wheel and a steering column, a stationary column supporting the lock above said steering wheel, a locking plunger carried by said lock and adapted to engage with apertures in said steering wheel and means for actuating said locking plunger into and out of engagement with said steering wheel, means carried by said lock for concealing and protecting the locking plunger and a portion of the steering wheel with which it engages.

2. In combination, a steering wheel and steering wheel column, said steering wheel having a plurality of apertures arranged in the upper face of the hub thereof in a substantially circular position, a stationary member and a casing carried thereby, a lock in said casing, a plunger adapted to be actuated by said lock to engage one of said apertures to lock said steering wheel in a stationary position, means for connecting said plunger to said lock, and means to overlap and protect said plunger and a portion of the hub in which the apertures are located to prevent tampering with the locking engagement therebetween.

3. In combination, a steering wheel and a steering wheel column, a plurality of apertures in the upper face of the hub of said steering wheel, a stationary member, a casing mounted thereon above the steering wheel, a locking plunger adapted to engage with one of said apertures, means in said casing for yieldingly forcing said plunger into such engagement, and a lock carried by said casing for locking said plunger in a disengaging position.

4. In combination, a steering wheel and a steering wheel column, a plurality of apertures in the upper face of the hub of said steering wheel, a stationary member, a casing mounted thereon above the steering wheel, a locking plunger adapted to engage with one of said apertures, means in said casing for yieldingly forcing said plunger into such engagement, and a lock carried by said casing for locking said plunger in a disengaging position, said casing having a downwardly extending portion to protect the locking apertures in the hub and the locking member.

In testimony whereof, I affix my signature.

LOUIS R. RUTHENBURG.